United States Patent [19]

Richardson et al.

[11] Patent Number: 6,098,033
[45] Date of Patent: Aug. 1, 2000

[54] DETERMINING SIMILARITY BETWEEN WORDS

[75] Inventors: Stephen D. Richardson; William B. Dolan, both of Redmond, Wash.

[73] Assignee: Microsoft Corporation, Redmond, Wash.

[21] Appl. No.: 08/904,223

[22] Filed: Jul. 31, 1997

[51] Int. Cl.[7] .................................................. G06F 17/27
[52] U.S. Cl. .................................................. 704/1; 704/9
[58] Field of Search ..................... 704/1, 9, 10; 707/530, 707/531, 532, 533

[56] References Cited

U.S. PATENT DOCUMENTS

| | | | |
|---|---|---|---|
| 5,325,298 | 6/1994 | Gallant ........................................ | 704/9 |
| 5,424,947 | 6/1995 | Nagao et al. ............................... | 704/9 |
| 5,675,819 | 10/1997 | Schuetze .................................... | 704/9 |
| 5,724,594 | 3/1998 | Pentheroudakis ........................... | 704/9 |

OTHER PUBLICATIONS

Dagan et al., "Similarity–Based Estimation of Word Coocurrence Probabilities," in Proceedings of the 32nd Annual Meeting of the ACL, 1994, pp. 272–278.

Dagan et al.,"Contextual Word Similarity nad Etimation From Sparse Data,"in Proceedings of the 31st Annual Meeting of the the Assoc. for Computational Linguistics, Columbus, OH, Jun. 2–26, 19993, pp.164–171.

Eesnik, Philip, "Disambiguating Noun Groups With Respect to WordNet Senses,"in Proceedings of the Third Worshop on Very Large Corpora, MA, Jun. 31, 1995, pp.1–16.

Salton, Gerard, and Michael J. McGill, *Introduction to Modern Information Retrieval*, McGraw–Hill Publishing Co., New York, NY, 1983, entire book.

Sadler, Victor, *Working With Analogical Semantics: Disambiguation Techniques in DLT*, Foris Publications, Dordrecht, Holland, 1989, entire book.

Wilks et al., "Providing Machine Tractable Dictionary Tools," *Machine Translations* 5:99–154, 1990.

Hindle, Donald, "Noun Classification From Predicate–Argument Structures," in *Proceedings of the 28th Annual Meeting of the ACL*, Pittsburgh, PA, Jun. 6–9, 1990, pp. 268–275.

Sato, Satoshi, "Example–Based Machine Translation," in *Proceedings of the International Workshop on Fundamental Research for the Future Generation of Natural Language Processing*, Kyoto, Japan, Sep. 1991, pp. 1–16.

Sumita, Eiichiro, and Hitoshi Iida, "Experiments and Prospects of Example–Based Machine Translation," in *Proceedings of the 29th Annual Meeting of the ACL*, 1991, pp. 185–192.

Hearst, Marti A., and Gregory Grefenstette, "Refining Automatically–Discovered Lexical Relations: Combining Weak Techniques for Stronger Results," in *Papers From the 1992 AAAI Workshop*, Menlo Park, CA, 1992, pp. 64–72.

(List continued on next page.)

*Primary Examiner*—Forester W. Isen
*Assistant Examiner*—Patrick N. Edouard
*Attorney, Agent, or Firm*—Joseph R. Kelly; Westman, Champlin & Kelly P.A.

[57] ABSTRACT

The present invention provides a facility for determining similarity between two input words utilizing the frequencies with which path patterns occurring between the words occur between words known to be synonyms. A preferred embodiment of the facility utilizes a training phase and a similarity determination phase. In the training phase, the facility first identifies, for a number of pairs of synonyms, the most salient semantic relation paths between each pair of synonyms. The facility then extracts from these semantic relation paths their path patterns, which each comprise a series of directional relation types. The number of times that each path pattern occurs between pairs of synonyms, called the frequency of the path pattern, is counted. In the training phase, the facility identifies the most salient semantic relation paths between the input words, and extracts their path patterns. The facility then averages the frequencies counted in the training phase for the path patterns extracted for the input words in order to obtain a quantitative measure of the similarity between the input words.

27 Claims, 7 Drawing Sheets

OTHER PUBLICATIONS

Furuse, Osamu, and Hitoshi Iida, "An Example–Based Method for Transfer–Driven Machine Translation," in *Proc. of the 4th International Conference on Theoretical and Methodological Issues in Machine Translation*, Montreal, Quebec, Canada, 1992, pp. 139–150.

Yarowsky, David, "Word–Sense Disambiguation Using Statistical Models of Roget's Categories Trained on Large Corpora," in *Proceedings of the 15th Int'l. Conference on Computational Linguistics*, Nantes, France, Aug. 23–28, 1992, pp. 454–460.

Brown et al., "Class–Based n–gram Models of Natural Language," *Computational Linguistics 18*(4):467–479, Dec. 1992.

Tsutsumi, Taijiro, *Natural Language Processing: The PLNLP Approach*, Kluwer Academic Publishers, Boston, MA, 1993, Chap. 20, "Word–Sense Disambiguation by Examples," pp. 263–272.

Pereira et al., "Distributional Clustering of English Words," in *Proceedings of the 31st Annual Meeting of the Assoc. for Computational Linguistics*, Columbus, OH, Jun. 22–26, 1993, pp. 183–190.

Kozima, Hideki, and Teiji Furugori, "Similarity Between Words Computed by Spreading Activation on an English Dictionary," in *Proceedings of the 6th Conference of the European Chapter of the ACL*, Utrecht, Germany, 1993, pp. 232–240.

Braden–Harder, Lisa, *Natural Language Processing: The PLNLP Approach*, Kluwer Academic Publishers, Boston, MA, 1993, Chap. 19, "Sense Disambiguation Using Online Dictionaries," pp. 247–261.

Utsuro et al., "Thesaurus–Based Efficient Example Retrieval by Generating Retrieval Queries From Similarities," in *Proceedings of the 15th International Conference on Computational Linguistics*, Kyoto, Japan, Aug. 5–9, 1994, pp. 1044–1048.

Grishman, Ralph, and John Sterling, "Generalizing Automatically Generated Selectional Patterns," in *Proceedings of the 15th International Conference on Computational Linguistics*, Kyoto, Japan, Aug. 5–9, 1994, pp. 742–747.

Uramoto, Naohiko, "A Best–Match Algorithm for Broad––Coverage Example–Based Disambiguation," in *Proceedings of the 15th International Conference on Computational Linguistics*, Kyoto, Japan, Aug. 5–9, 1994, pp. 717–721.

Resnik, Philip, "Disambiguating Noun Groupings With Respect to WordNet Senses," in *Proceedings of the 3rd Workshop on Very Large Corpora*, Boston, MA, Jun. 30, 1995, pp. 1–16.

Agirre, Eneko, and German Rigau, "Word Sense Disambiguation Using Conceptual Density," in *Proceedings of COLING 96*, 1996, pp. 16–23.

| path pattern | frequency |
|---|---|
| Hypernym HypernymOf | 14239 |
| Hypernym HypernymOf Hypernym | 5596 |
| HypernymOf Hypernym HypernymOf | 4891 |
| HypernymOf Hypernym | 3453 |
| Hypernym | 2916 |
| HypernymOf | 2755 |
| TypicalObjectOf TypicalObject | 2447 |
| TypicalObject TypicalObjectOf | 2339 |
| Hypernym Hypernym | 1928 |
| Synonym HypernymOf | 1724 |
| TypicalObjectOf HypernymOf | 1691 |
| HypernymOf HypernymOf | 1640 |
| ... | ... |
| Hypernym HypernymOf TypicalSubjectOf | 601 |
| ... | ... |

Path Pattern Frequency Table

*Fig. 4*

| path pattern | frequency |
|---|---|
| Hypernym HypernymOf | 14111 |
| Hypernym HypernymOf Hypernym | 5536 |
| HypernymOf Hypernym HypernymOf | 4810 |
| HypernymOf Hypernym | 3412 |
| Hypernym | 2888 |
| HypernymOf | 2739 |
| TypicalObjectOf TypicalObject | 2447 |
| TypicalObject TypicalObjectOf | 2303 |
| Hypernym Hypernym | 1911 |
| Synonym HypernymOf | 1698 |
| TypicalObjectOf HypernymOf | 1691 |
| HypernymOf HypernymOf | 1622 |
| ... | ... |
| Hypernym HypernymOf TypicalSubjectOf | 219 |
| ... | ... |

Path Pattern Frequency Table

DETERMINING SIMILARITY BETWEEN WORDS

TECHNICAL FIELD

The present invention is directed to the field of computational linguistics, and, more particularly, to the field of analyzing word similarity.

BACKGROUND OF THE INVENTION

A thesaurus is a resource for identifying synonyms of a given word; that is, additional words having the same or nearly the same meaning as the given word. Thesauri are generally compiled manually, and in many cases require the investment of thousands of person-hours by skilled linguists. Because of the significant time and monetary costs of manually compiling a thesaurus, thesauri are seldom compiled for the special vocabularies used in particular subject matter domains, such as firefighting, microbiology, or software development. Such subject matter domain thesauri may be useful for understanding relationships between words that are present in a subject matter domain vocabulary, but not present in general vocabularies, as well as relationships between words that have connotations in a subject matter domain vocabulary that are different from those in general vocabularies.

Conventional thesauri may be used to determine whether or not two specified words are considered synonyms. They are not, however, able to quantify the extent to which the meanings of a pair of synonyms are similar. Conventional thesauri are similarly unable to quantify the extent to which the meanings of a pair of non-synonyms are similar. Given the above shortcomings of conventional thesauri, an automated approach to constructing thesauri and quantitatively determining the similarity between words would have significant utility.

SUMMARY OF THE INVENTION

The invention is directed to using similarity-connoting semantic path patterns to quantitatively determine the paradigmatic, or "substitutional," similarity between a pair of words. A semantic relation is a unidirectional link between two words labeled with a particular semantic relation type. A semantic path is a chain of semantic relations that connects two words. Each semantic path has a path pattern, constructed by extracting from the path the relation type of each relation in order.

The invention is based upon a recognition that the existence of certain semantic path patterns between a pair of words indicates that the pair of words is similar. The invention involves a training phase and a similarity determination phase. In the training phase, the invention obtains pairs of synonyms, and, for each synonym pair, identifies the most salient paths connecting the synonym pairs, extracts the path pattern of each such path, and counts the frequency with which these path patterns occur. In the similarity determination phase, the invention receives an input pair of words, and quantitatively determines the similarity of the input words. The invention first identifies the most salient paths between the input words, and extracts the path patterns for these paths. The invention then determines the frequency counted during the training phase for each extracted path pattern, and computes the average of these frequencies. This average frequency represents a relative measure of the similarity of the input words. The invention may also be applied to quantitatively determine the relative level of similarity between two different senses of the same word.

BRIEF DESCRIPTION OF THE DRAWINGS

FIG. 4 is a data structure diagram showing sample contents of the pattern frequency table after the performance of positive training.

FIG. 6 is a data structure diagram showing sample contents of the path pattern frequency table after the performance of positive and negative training.

DETAILED DESCRIPTION OF THE INVENTION

Figure 1:
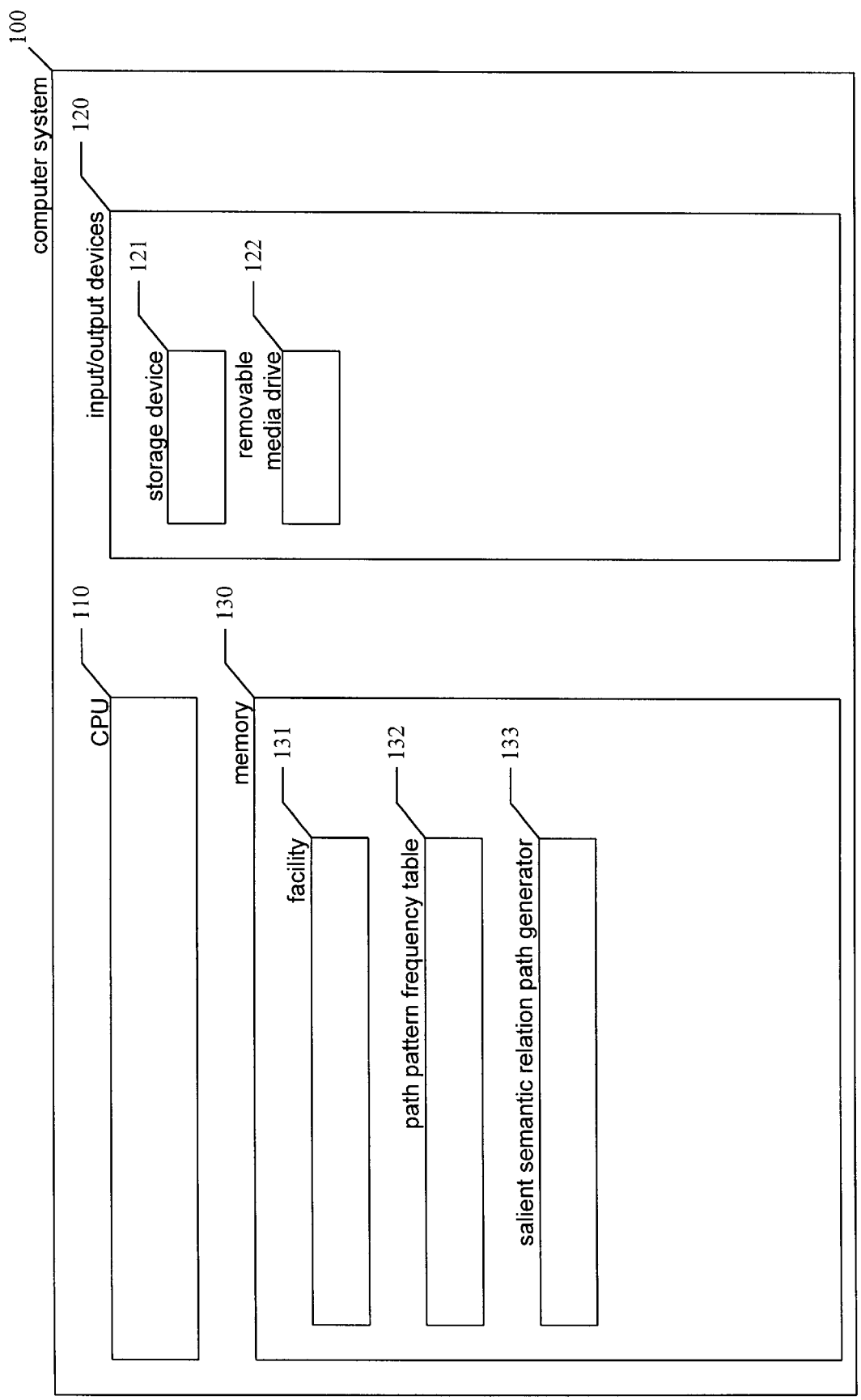
FIG. 1 is a high-level block diagram of the general-purpose computer system upon which the facility preferably executes.

The invention is directed to using similarity-connoting semantic path patterns to quantitatively determine the paradigmatic, or "substitutional," similarity between a pair of words. Words that are paradigmatically similar are those whose meanings are taxonomically similar, meaning that the words are synonyms, or that one of the words is a hypernym of the other word, or that the two words have a hypernym in common. For example, the word "beverage" is a hypernym of the words "water" and "juice." "Water" and "juice" are synonyms, and are both hyponyms of "beverage." As such, the words "beverage," "water," and "juice" are all paradigmatically related.

Paradigmatically similar words can be distinguished from syntagmatically related words. Syntagmatically related words are those that are typically used together, such as a noun that is frequently the object of a verb, or a noun that is frequently the subject of a verb. For example, the noun "beverage" is frequently the object of the verb "drink." The words "beverage" and "drink" are therefore syntagmatically related.

The invention preferably uses linguistic information abstracted in a resource called a "lexical knowledge base" in order to determine the level of similarity between pairs of words. While a general description of the lexical knowledge base preferably used by the invention follows herein, this lexical knowledge base and its construction are described more completely in U.S. patent application Ser. No. 08/227, 247 entitled "Method and System for Compiling a Lexical Knowledge Base," which is hereby incorporated by reference.

The lexical knowledge base relates the meanings of different words via a network of "semantic relations." Each semantic relation relates the meanings of a pair of words in a well-defined way, using a directional relation type. For example, the following relation indicates that the noun "boat" is often the subject of the verb "float":

boat←TypicalSubject—float

This semantic relation is said to have the relation type "TypicalSubject." Relation types include many common kinds of relations in meaning, such as: Cause, Domain, Hypernym, Location, Manner, Material, Means, Modifier, Part, Possessor, Purpose, QuasiHypernym ("Quespernym"), Synonym, Time, TypicalObject, TypicalSubject, and User. Because the lexical knowledge base preferably contains many such semantic relations, semantic relation paths (or simply "paths") may be formed between arbitrarily selected pairs of words by linking together semantic relations. For example, the above semantic relation can be linked together with the semantic relation float—Location→water in order to form the following path between "boat" and "water," which indicates that boats typically float in water:

boat←TypicalSubject—float—Location→water

When using a large lexical knowledge base containing a large number of semantic relations, it is common for a large number of these paths to exist between a pair of related words. Each such path conveys some information about the relationship between the meanings of the words of the pair. The degree of usefulness of the information conveyed to a human language user by a particular path is referred to as the "salience" of the path—the more useful the information conveyed, the more salient the path.

Paths may be characterized by their "path patterns"—that is, the ordered list of their relation types. For example, the path pattern of the above path is ←TypicalSubject— —Location→, which may also be expressed as "TypicalSubjectOf Location," wherein the presence or absence of the word "Of" at the end of a relation type indicates its direction. The invention is based upon a recognition that the existence of paths having certain path patterns between a pair of words indicates that the pair of words is similar. The invention involves a training phase for identifying and weighting these path patterns and a similarity determination phase for determining the level of similarity between pairs of words using the path pattern weights determined in the training phase. In the training phase, the invention obtains pairs of synonyms, and, for each synonym pair, identifies the most salient paths connecting the synonym pairs, extracts the path pattern of each such path, and counts the frequency with which these path patterns occur. This frequency, called a path pattern frequency or path pattern weight, characterizes the tendency of each path pattern to indicate the similarity of words that are connected by paths having the path pattern. In the similarity determination phase, the invention receives an input pair of words, and quantitatively determines the similarity of the input words. The invention first identifies the most salient paths between the input words, and extracts the path patterns for these paths. The invention then determines the frequency counted during the training phase for each extracted path pattern, and computes the average of these frequencies. This average frequency represents a relative measure of the similarity of the input words. The same process may be applied to quantitatively determine the relative level of similarity between two senses of the same word.

The salient semantic relation path generator used by the facility to identify most salient semantic relation paths between two words preferably derives these most salient paths from a lexical knowledge base compiled automatically for a particular subject matter domain from a corpus of documents that are representative of the subject matter domain. A preferred implementation of such a salient semantic relation path generator is described in detail in U.S. patent application Ser. No. 08/904,418 entitled "IDENTIFYING SALIENT SEMANTIC RELATION PATHS BETWEEN TWO WORDS."

FIG. 1 is a high-level block diagram of the general-purpose computer system upon which the facility preferably executes. The computer system 100 contains a central processing unit (CPU) 110, input/output devices 120, and a computer memory (memory) 130. Among the input/output devices is a storage device 121, such as a hard disk drive, and one or more removable media drives 122, which can be used to install software products, including the facility, that are provided on a computer-readable medium, such as a CD-ROM. The memory 130 preferably contains the similarity determination facility (facility) 131, the path pattern frequency table 132 created and used by the facility to represent the similarity potential of path patterns, and the salient semantic relation path generator 133 used by the facility to identify the most salient paths between two words. While the facility is preferably implemented on a computer system configured as described above, those skilled in the art will recognize that it may also be implemented on computer systems having different configurations.

Figure 2:
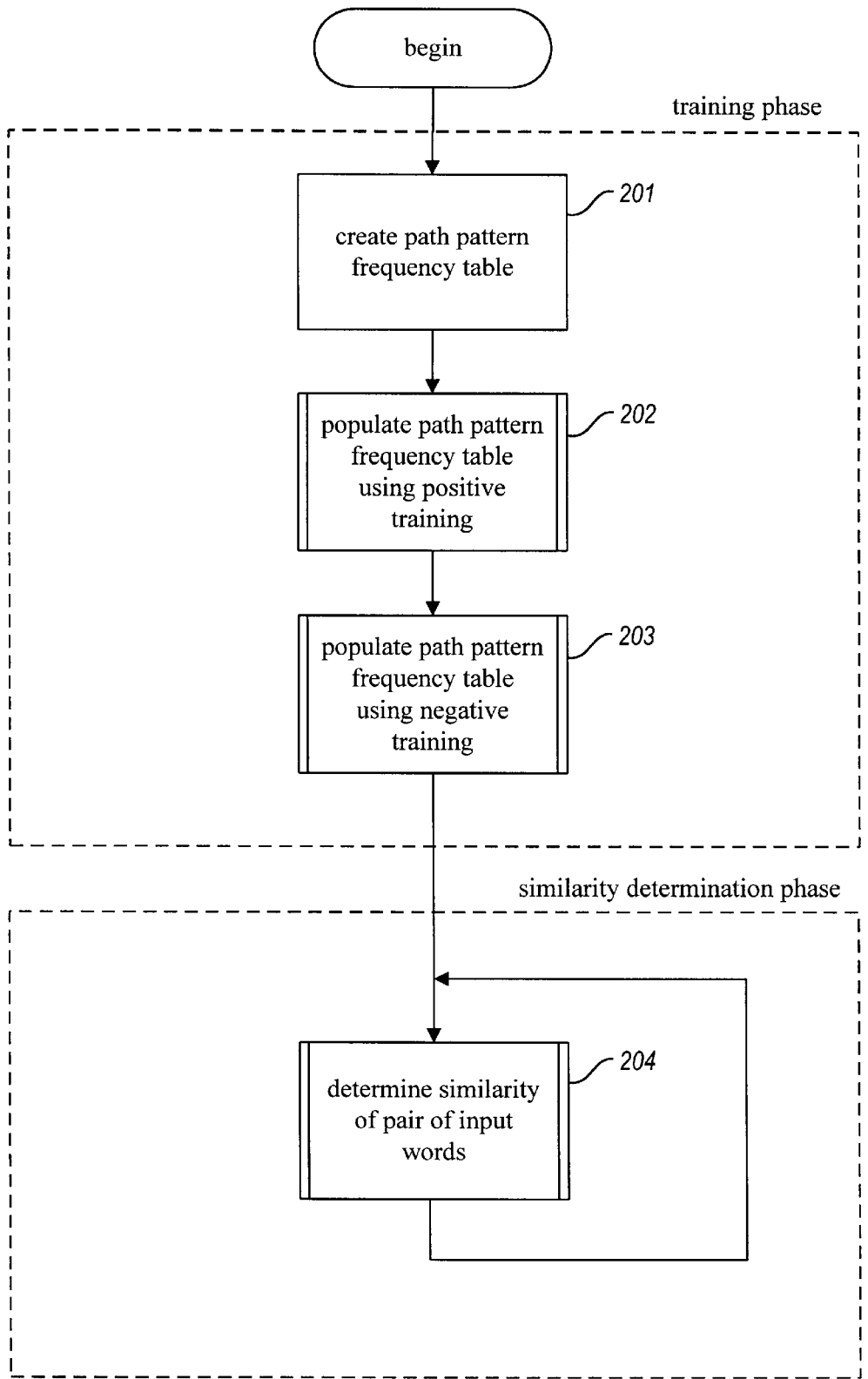
FIG. 2 is an overview flow diagram showing the high-level steps preferably performed by the facility in order to determine the similarity of pairs of input words.

FIG. 2 is an overview flow diagram showing the high-level steps preferably performed by the facility in order to determine the similarity of pairs of input words. The process comprises a training phase containing steps 201–203, which create and populate a path pattern frequency table, and a similarity determination phase containing step 204, which uses the calculated path pattern frequency table to determine the similarity of pairs of input words. In step 201, the facility creates a path pattern frequency table. As discussed further below in conjunction with FIGS. 4 and 6, the path pattern frequency table contains entries each corresponding to a unique path pattern. Each entry contains a frequency, indicating the number of times the path pattern occurs among salient semantic relation paths between words known to be synonyms. In step 202, the facility populates the path pattern frequency table created in step 201 using "positive training." As is discussed further below in conjunction with FIG. 3, "positive training" denotes incrementing frequency counts in the path pattern frequency table for salient paths between words known to be synonyms. In step 203, the facility further populates the path pattern frequency table created in step 201 using "negative training." As is discussed further below in connection with FIG. 5, "negative training" denotes decrementing frequency counts in the path pattern frequency table for path patterns occurring in salient semantic relations between words known to not be synonyms.

After step 203, the facility leaves the training phase and enters the similarity determination phase. In step 204, the facility determines the similarity of a pair of input words. The performance of step 204 is discussed further below in conjunction with FIG. 7. After step 204, the facility continues at step 204 to determine the similarity of a next pair of input words. Such reiteration of step 204 may occur immediately if additional pairs of input words have been queued. On the other hand, if no pairs of input words have been queued, the reiteration of step 204 is preferably delayed until the next pair of input words is received. Although no ending terminal is shown in FIG. 2, the reiteration of step 204 may preferably be interrupted, and resumed at a later time, if desired.

Figure 3:
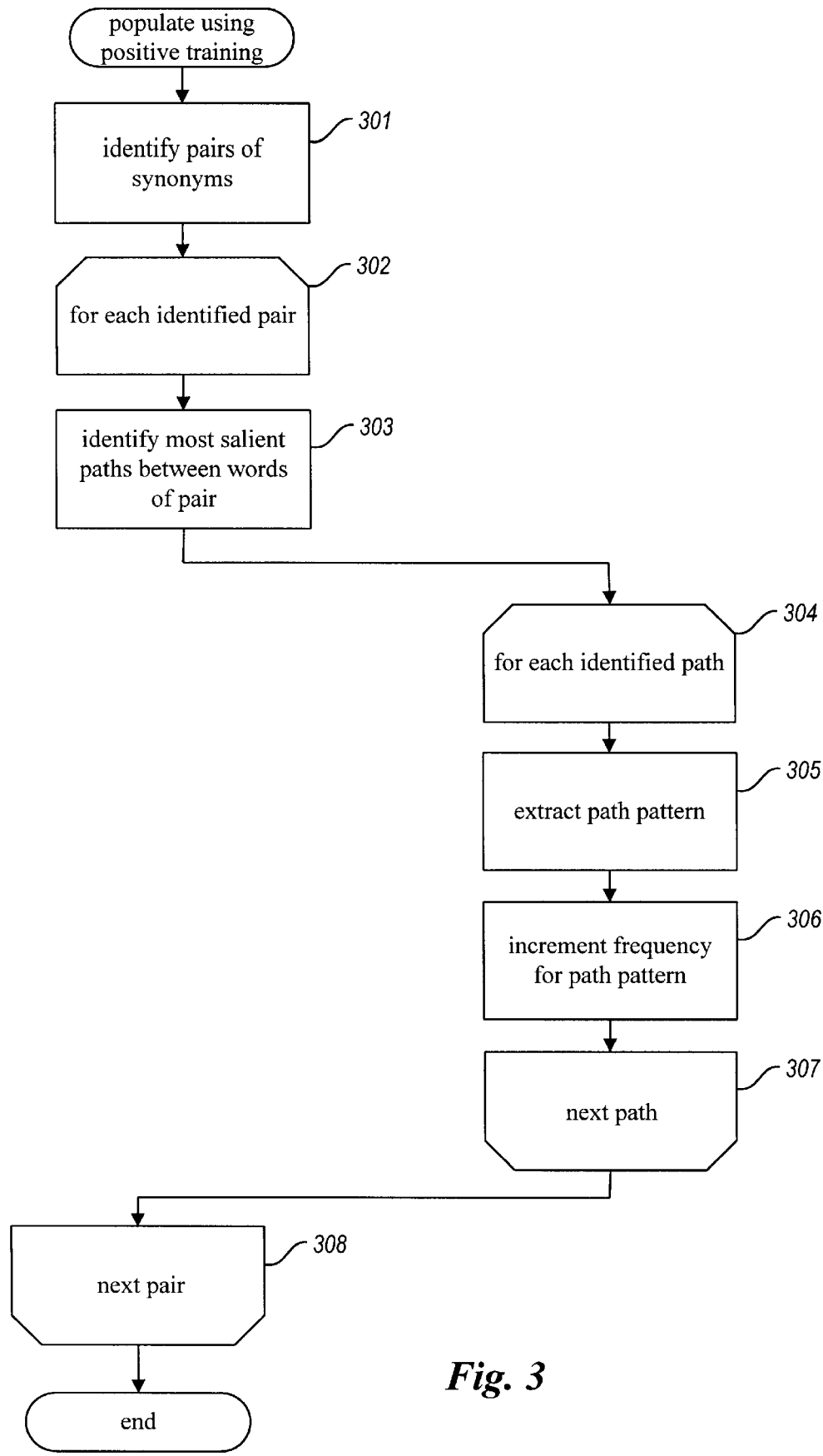
FIG. 3 is a flow diagram showing the steps preferably performed by the facility to populate the path pattern frequency table using positive training.

FIG. 3 is a flow diagram showing the steps preferably performed by the facility to populate the path pattern frequency table using positive training. When these steps are performed, the path pattern frequency table has preferably just been created in step 201, and is empty. On the other hand, these steps may preferably also be performed to further populate a path pattern frequency table that has been partially populated by earlier training. In step 301, the facility identifies a large number of pairs of synonyms, preferably by using a thesaurus. For example, one pair of synonyms identified by the facility might be the verbs "observe" and "see." While the facility can provide useful results for a fairly large range of different numbers of synonym pairs, a large number of synonym pairs, such as 50,000, is preferably used. In steps 302–308, the facility loops through each pair of synonyms identified in step 301. That is, steps 303–307 are repeated for each identified pair of synonyms.

In step 303, the facility identifies the most salient paths between the words of the pair. The most salient paths between two words are those that provide the most useful information about the relationship of the meaning of the two words, and are roughly coextensive with the semantic relation paths between the two words most likely to be identified by human language users. Each semantic path is an ordered series of semantic relations, which in turn are each a pair of words connected by a directional relation type. For example, a semantic relation path occurring between the identified synonyms "observe" and "see" is observe←Hypernym→notice←Hypernym—see, which indicates that the verb "notice" is a hypernym of, or a more general term for, both the verb "observe" and the verb "see."

Step 303 is preferably performed using a salient path identification process described in detail in U.S. patent Ser. No. 08/904,418, entitled "IDENTIFYING SALIENT SEMANTIC RELATION PATHS BETWEEN TWO WORDS." In step 303, the facility preferably identifies a number of salient paths up to a maximum number, such as ten.

In steps 304–307, the facility loops through the paths identified in step 303. That is, steps 305–306 are repeated for each identified path. In step 305, the facility extracts the path pattern of the identified path. Step 305 is performed by copying the directional relation types from the path, in the same order in which they occur in the path. For example, for the path shown above between the synonyms "observe" and "see," the path pattern extracted by the facility would be —Hypernym→ ←Hypernym—, which is alternatively expressed as "Hypernym HypernymOf," such that the direction of each relation type is represented by the presence or absence of the word "Of" at the end of the relation name. In step 306, the facility increments the frequency stored in the path pattern frequency table for the path pattern extracted in step 305. Step 306 preferably involves determining whether an entry exists in the path pattern frequency table for the extracted path pattern frequency. If so, the frequency in this entry is incremented. If not, the absence of this path pattern from the table indicates that the path pattern presently has a frequency value of 0. The facility therefore adds an entry to the path pattern frequency table for the extracted path pattern, and sets the frequency of the new entry equal to 1.

In step 307, if additional identified paths remain, the facility continues its step 304 to process the next identified path, else the facility continues at step 308. In step 308, if additional pairs of synonyms remain, then the facility continues at step 302 to process the next identified pair of synonyms, else the steps conclude.

FIG. 4 is a data structure diagram showing sample contents of the pattern frequency table after the performance of positive training. The path pattern frequency table is made up of entries, such as entries 431–442 and 450, each indicating the frequency of a unique path pattern. Each row contains the identity of a path pattern 410 and an indication of the frequency for that path pattern 420. For example, the first entry 431 indicates that frequency of the unique path pattern "Hypernym HypernymOf" after positive training is 14,239. The entries of the path pattern frequency table 400 shown in FIG. 4 are sorted in decreasing order of frequency in order to show path patterns having the highest frequencies. In various preferred embodiments, however, the path pattern frequency table is unsorted, or sorted on the path pattern column. It can be seen from FIG. 4 that many of the path patterns having the highest frequencies contain the relation type "Hypernym," and, to a lesser extent, the relation type "Synonym" (as well as the reverse-direction versions of these relation types), which are paradigmatic relation types. Several high-frequency path patterns also contain the relation type "TypicalObject," which is a syntagmatic relation type. Words appearing in equivalent syntagmatic contexts as indicated by the "TypicalObjectOf TypicalObject" path pattern are often paradigmatically similar. For example, consider the semantic relation path letters←TypicalObject—write—TypicalObject→notes, which indicates that both "letters" and "notes" are typical objects of the verb "write." Since the two semantic relations of this path share a common syntagmatic relation with the same word, the words "letters" and "notes" can be considered paradigmatically similar.

It can further be seen that many of the path patterns having the highest frequencies are symmetrical, meaning that they are identical to their mirror image. The mirror image of any path pattern may be obtained by reversing the order of the path pattern's relation types, then inverting the direction of each relation type. For example, entries 431, 434, 437, and 438 are symmetrical, as they are identical to their mirror images.

On the other hand, path patterns 432 and 433 are mirror images of each other, as are path patterns 435 and 436. Because these path patterns are not identical to these mirror images, they are not symmetrical. Because mirror image path patterns merely convey the same information in a different order, they are generally regarded as equivalent. Therefore, while mirror image path patterns 432 and 433 are shown as having separate entries in the path pattern frequency table, in an alternative embodiment, the frequencies of mirror image path patterns are counted together in a single entry. This alternative embodiment regards mirror image path patterns as identical, and prevents the facility from under-weighting path patterns that occur less frequently than their mirror images during the training phase.

Figure 5:
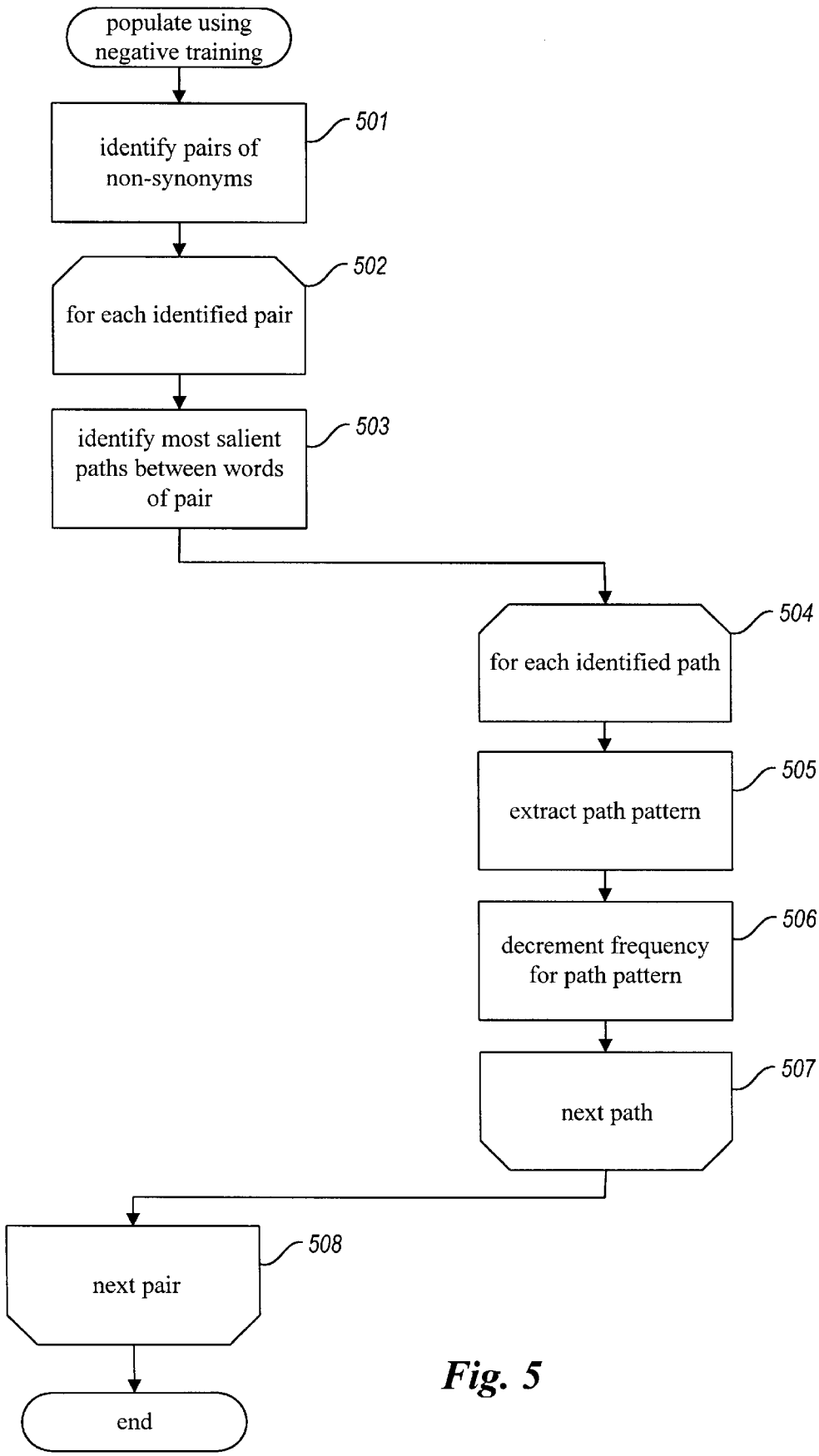
FIG. 5 is a flow diagram showing the steps preferably performed by the facility to populate the path pattern frequency table using negative training.

After the facility has placed the table in this state by performing positive training in accordance with step 202, the facility performs negative training in accordance with step 203. FIG. 5 is a flow diagram showing the steps preferably performed by the facility to populate the path pattern frequency table using negative training. It can be seen that these steps closely parallel the steps shown in FIG. 3 for populating the path pattern frequency table using positive training. In step 501, the facility identifies a large number of pairs of words that are not synonyms. Step 501 preferably involves choosing pairs of words at random from a dictionary, and ensuring that they are not identified as synonyms by a thesaurus. In steps 502–508, the facility loops through each pair of non-synonyms identified in step 501. That is, steps 503–507 are repeated for each identified pair of non-synonyms. In step 503, the facility identifies the most salient semantic relation paths between the words of the pair. As discussed above, the most salient paths between two words are those that provide the most useful information about the relationship of the meaning of the two words, and are roughly coextensive with the paths between the two words most likely to be identified by human language users. Step 503 is preferably performed using a salient path identification process described in detail in U.S. patent Ser. No. 08/904,418, entitled "IDENTIFYING SALIENT SEMANTIC RELATION PATHS BETWEEN TWO WORDS." In step 503, the facility preferably identifies a number of salient paths up to a maximum number, such as ten.

In steps 504–507, the facility loops through the paths identified in step 503. That is, steps 505–506 are repeated for each identified path. In step 505, the facility extracts the path pattern of the identified path. Step 505 is performed by copying the directional relation types from the path, in the same order in which they occur in the path. In step 506, the facility decrements the frequency, if any, stored in the path pattern frequency table for the path pattern extracted in step 505. In step 507, if additional identified paths remain, the facility continues its step 504 to process the next identified path, else the facility continues at step 508. In step 508, if additional pairs of non-synonyms remain, then the facility continues at step 502 to process the next identified pair of synonyms, else the steps conclude.

FIG. 6 is a data structure diagram showing sample contents of the path pattern frequency table after the performance of positive and negative training. It can be seen by comparing FIG. 6 to FIG. 4 that negative training has reduced the frequencies of several entries. In particular, negative training has significantly reduced the frequency of path pattern 650 "Hypernym HypernymOf TypicalSubjectOf" from 601 to 219. This is a path pattern that, besides occurring commonly between synonyms, also occurs commonly between unrelated words. For example, in a 15 representative dictionary from which salient semantic relation paths are derived, word usage examples frequently use such path patterns to connect unrelated words. For instance, the path pattern "Hypernym HypernymOf TypicalSubjectOf" is used to connect the paradigmatically unrelated words "cat" and "jump":

cat—Hypernym→animal←Hypernym—gazelle←TypicalSubject—jump

While this path pattern occurs frequently between synonyms, it also occurs frequently between unrelated words. This makes it an unreliable indicator of similarity between words, and thus its frequency is significantly reduced during the process of negative training.

Figure 7:
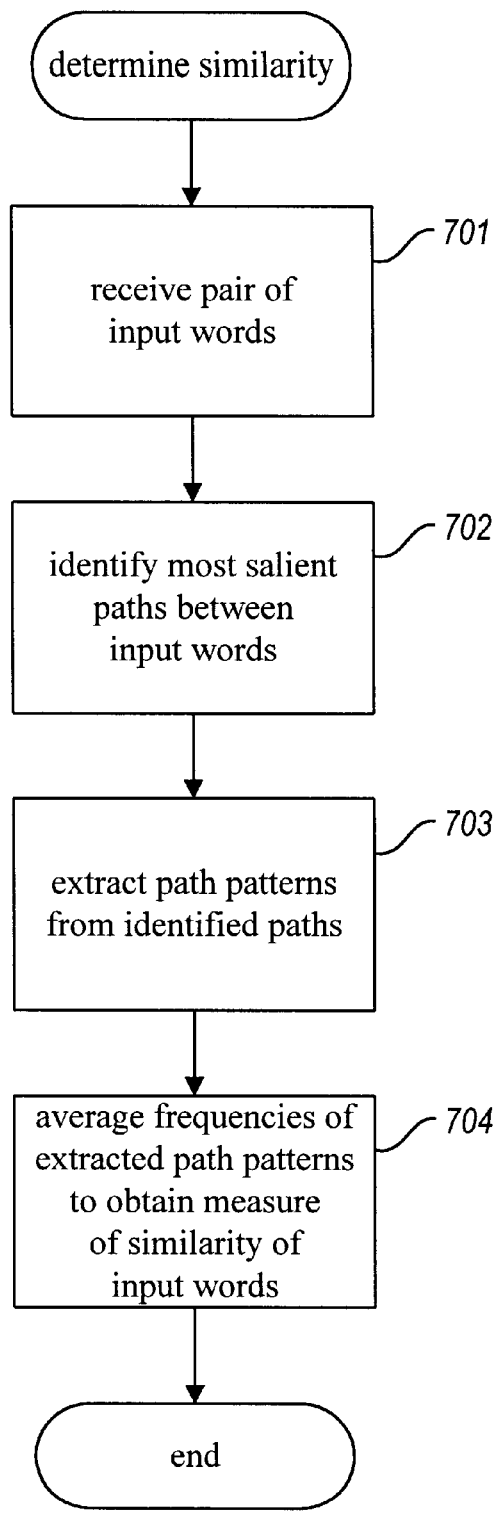
FIG. 7 is a flow diagram showing the steps preferably performed by the facility to quantitatively determine the similarity between two input words using the populated path pattern frequency table.

FIG. 7 is a flow diagram showing the steps preferably performed by the facility to quantitatively determine the similarity between two input words using the populated path pattern frequency table. These steps are preferably executed once for each pair of input words. In step 701, the facility receives a pair of input words. For example, the facility might receive the input words "cheetah" and "frog." In step 702, the facility identifies the most salient paths between input words. As discussed above, the facility preferably performs step 702 using a mechanism for identifying salient paths described in detail in U.S. patent application Ser. No. 08/904,418, entitled "IDENTIFYING SALIENT SEMANTIC RELATION PATHS BETWEEN TWO WORDS." Up to a maximum number of the most salient paths, such as ten, are preferably identified. For example, the facility might select the path cheetah—Hypernym→animal←Hypernym—frog as one of the most salient paths between "cheetah" and "frog." In step 703, the facility extracts from the identified paths their path patterns. For example, the facility would extract the path pattern "Hypernym HypernymOf" from the above path. In step 704, the facility averages the frequencies stored in the path pattern frequency table for the path patterns extracted in step 703 to obtain a measure of the similarity of the input words. In the example, to obtain the measure of similarity between "cheetah" and "frog," the facility would average the frequency for the path pattern "Hypernym HypernymOf," 14239, found in entry 631 of the path pattern frequency table, with the frequencies of the other path patterns extracted in step 703. These steps then conclude.

In order to standardize the average frequency measure of similarity computed in step 704, the facility preferably divides the average frequency measure of similarity by the sum of positive path pattern frequencies in the path pattern frequency table at the conclusion of the training phase. Such standardization tends to produce reasonably consistent measures of similarity for the same input words across training samples having different sizes. Indeed, this standardization permits the useful application of an absolute similarity threshold. In a preferred embodiment, such an absolute similarity threshold is determined using positive and negative testing data. The facility first identifies a large number of positive testing word pairs (such as 50,000) known to be similar by, for example, selecting pairs of synonyms from a thesaurus. The facility also identifies a similarly large number of negative testing word pairs known to not be similar by, for example, selecting pairs of words at random and ensuring that they are not listed as synonyms in a thesaurus. The facility then computes the standardized measure of similarity for each of the positive and negative testing pairs, and selects a threshold that maximizes both the number of negative testing pairs having similarity measures below the threshold and the number of positive testing pairs having similarity measures above the threshold. Using this process, it has been empirically determined for the lexical knowledge base described in U.S. patent application Ser. No. 08/277,247 entitled "Method and System for Compiling a Lexical Knowledge Base" that standardized measures of similarity in which the average frequency of non-salient paths has been divided by the sum of positive path pattern frequencies that have a value greater than about 0.0015 indicate a significant level of similarity between input words with a reasonable level of reliability. Those skilled in the art will appreciate that this particular threshold is dependent upon the corpus and testing pairs used and details of the implementation of the path saliency assessment process, and that, in different conditions, this process would produce a different threshold appropriate under those conditions.

It has further been determined that, after the training phase, the size of the path pattern frequency table may be reduced by discarding a large number of the path patterns with the smallest frequencies without adversely affecting the measure of similarity provided by the facility for input word pairs. For example, the path patterns having the lowest 99% of frequencies may be discarded in this manner (and be thereafter considered to have a frequency of zero), leaving only those path patterns having the top 1% of frequencies.

The remaining path patterns are said to indicate similarity between input words when salient semantic relations having one or more of these path patterns occur between the input words.

The approach described above may also be applied to quantitatively determine the relative level of similarity between two senses of a polysemous word. In a sense-disambiguated lexical knowledge base, some or all of the nodes representing occurrences of a word in a corpus have a sense characterization identifying a sense of the word that is believed to apply to the word occurrence represented by the node. For example, in a subgraph of a sense-disambiguated lexical knowledge base representing the corpus text segment "honey runs smoothly with unbroken continuity," the node representing the occurrence of "run" in has a sense characterization indicating that the occurrence of "run" has sense 115. This sense characterization disambiguates the meaning of the occurrence "run" in the corpus text segment by specifying the one sense among the four senses of "run" shown below in Table 1 that applies to the occurrence.

run, sense 100 (verb): to stride quickly
run, sense 115 (verb): (of liquids, sand, etc.) to flow
run, sense 315 (verb): to issue or move in a stream
run, sense 316 (noun): a movement or flow Table 1

In interpreting the lexical knowledge base's representation of this corpus text segment, it can be useful to determine how similar the meaning of sense 115 of "run" is to the meaning of other senses of "run". Indeed, when a sense-disambiguated lexical knowledge base is derived from more than one dictionary, it is very common for two senses, one from each dictionary, to be nearly identical in meaning. This is true, for example, of senses 115 and 315 above. Other senses have varying levels of similarity. For example, sense 316 of run is more similar to sense 115 than sense 100 is to sense 115, but less similar to sense 115 than sense 315 is to sense 115. Such assessments of the similarity between two senses of a word may be obtained by applying the process of the invention to the two word senses using a fully sense-disambiguated lexical knowledge base, in which each node representing a corpus word occurrence has a sense characterization. Constructing a fully sense-disambiguated lexical knowledge base is described in detail in U.S. patent application Ser. No. 08/904,422 entitled "BOOTSTRAPPING SENSE CHARACTERIZATIONS OF OCCURRENCES OF POLYSEMOUS WORDS," which is hereby incorporated by reference.

The steps shown in FIG. 7 for the similarity determination phase may be applied to determine the similarity between two senses of the same word rather than between two different words. Thus, in step 701, the facility receives a pair of senses of the same word. For example, the facility might receive senses 115 and 315 of "run." In step 702, the facility identifies the most salient paths between the two input senses. In step 703, the facility extracts from the identified paths their path patterns. In step 704, the facility averages the frequencies stored in the path pattern frequency table for the path patterns extracted in step 703 to obtain a measure of the similarity of the input words. These steps then conclude.

While this invention has been shown and described with reference to preferred embodiments, it will be understood by those skilled in the art that various changes or modifications in form and detail may be made without departing from the scope of the invention. For example, alternative mechanisms may be used to identify the most salient paths between a pair of words. Further, measures other than frequencies may be used by the facility to characterize the extent to which each path pattern indicates that two words are similar when the path pattern occurs between the two words. Also, such frequencies or other measures could be combined in a manner other than averaging. Further, path pattern frequencies or other path pattern weights may be stored in structures other than the path pattern table, such as a list or a tree. In addition, the facility may preferably be used to quantify other kinds of relationships between words besides paradigmatic similarity, including syntagmatic relatedness.

What is claimed is:

1. A method in a computer system for determining the similarity of a pair of input words, the method comprising:
   (a) selecting a multiplicity of pairs of words known to be synonyms;
   (b) for a each selected pair of synonyms:
      (1) identifying the most salient semantic relation paths connecting the words of the pair of synonyms, each identified semantic relation path comprising an ordered series of semantic relations, each semantic relation having a relation type; and
      (2) for each identified path:
         (A) extracting from the path a path pattern comprising the relation types of the relations of the path; and
         (B) augmenting a path pattern frequency indicating the likelihood that an arbitrary pair of words that are connected by a path having the extracted path pattern have similar meanings;
   (c) identifying the most salient semantic relation paths connecting the input words; and
   (d) obtaining from the path pattern frequencies for the path patterns of the identified paths a quantitative measure of the similarity of the input words.

2. The method of claim 1 wherein the pair of input words comprises two different words.

3. The method of claim 1 wherein the pair of input words comprises two different senses of the same word.

4. A method in a computer system for determining the similarity of a pair of input words using a list of path pattern weights, each path pattern weight indicating quantitatively the likelihood that an arbitrary pair of words connected by a path having the path pattern have similar meanings, the method comprising:

identifying a plurality of semantic relation paths connecting the input words, the identified paths comprising an ordered series of semantic relations each having a relation type;

combining the path pattern weights for the path patterns of the identified paths to obtain a quantitative measure of the similarity of the input words; and if the obtained quantitative measure of the similarity of the input words exceeds a minimum similarity measure, indicating that the input words are similar.

5. A computer-readable medium whose contents cause a computer system to determine the similarity of a pair of input words using a list of path patterns weights, each path pattern weight indicating quantitatively the likelihood that an arbitrary pair of words connected by a path having the path pattern have similar meanings, by:

identifying a plurality of semantic relation paths, the identified paths connecting the input words and comprising an ordered series of semantic relations, each semantic relation having a relation type;

averaging the path pattern weights for the path patterns of the identified paths to obtain a quantitative measure of the similarity of the input words; and if the obtained quantitative measure of the similarity of the input words exceeds a minimum similarity measure, indicating that the input words are similar.

6. A method in a computer system for identifying path patterns indicating similarity between word pairs connected by these path patterns, the method comprising:
(a) for a each of a multiplicity of pairs of words known to be synonyms:
    (1) identifying the most salient semantic relation paths connecting the words of the pair, each identified semantic relation comprising an ordered series of semantic relations, each semantic relation having a relation type; and
    (2) for each identified path:
        (A) extracting from the path a relation type path pattern comprising the relation types of the relations of the path; and
        (B) augmenting an indication of the likelihood that an arbitrary pair of words connected by a path having the extracted relation type path pattern have similar meanings, such that, after the performance of the method, the likelihood indications reflect the likelihood that an arbitrary pair of words connected by a path having the relation type path pattern have similar meanings.

7. The method of claim 6, further comprising:
(b) for a each of a multiplicity of pairs of words known to not be synonyms:
    (1) identifying the most salient semantic relation paths connecting the words of the pair, each identified semantic relation comprising an ordered series of semantic relations, each semantic relation having a relation type; and
    (2) for each identified path:
        (A) extracting from the path a relation type path pattern comprising the relation types of the relations of the path; and
        (B) reducing the indication of the likelihood that an arbitrary pair of words connected by a path having the relation type path pattern have similar meanings.

8. The method of claim 7 wherein the method utilizes a dictionary containing a list of words and a thesaurus identifying pairs of synonymous words, further comprising:
(c) identifying a pair of words known to not be synonyms by:
    (1) randomly selecting two words from the dictionary; and
    (2) determining that the randomly selected words are not identified as synonymous by the thesaurus.

9. A computer-readable medium whose contents cause a computer system to identify path patterns indicating similarity between word pairs connected by these path patterns by:
(a) for a each of a multiplicity of pairs of words known to be synonyms:
    (1) identifying the most salient semantic relation paths connecting the words of the pair, each identified semantic relation comprising an ordered series of semantic relations, each semantic relation having a relation type; and
    (2) for each identified path:
        (A) extracting from the path a relation type path pattern comprising the relation types of the relations of the path; and
        (B) incrementing a relation type path pattern frequency for the extracted relation type path pattern indicating the likelihood that an arbitrary pair of words connected by a path having the extracted relation type path pattern have similar meanings, such that, after the performance of the steps, the relation type path pattern frequencies of the relation type path patterns reflect the likelihood that an arbitrary pair of words connected by a path having the relation type path pattern have similar meanings.

10. The computer-readable medium of claim 9 wherein the contents of the computer-readable medium further cause the computer system to:
(b) for a each of a multiplicity of pairs of words known to not be synonyms:
    (1) identify the most salient semantic relation paths connecting the words of the pair, each identified semantic relation comprising an ordered series of semantic relations, each semantic relation having a relation type; and
    (2) for each identified path:
        (A) extract from the path a relation type path pattern comprising the relation types of the relations of the path; and
        (B) decrement the relation type path pattern frequency for the extracted relation type path pattern, thus reducing the reflected likelihood that an arbitrary pair of words connected by a path having the relation type path pattern have similar meanings.

11. A method in a computer system for determining the level of similarity of a pair of input words, the method comprising:
for each of a plurality of semantic relation type path patterns comprising an ordered series of semantic relation types:
    determining a weight for the semantic relation type path pattern characterizing the extent to which semantic relation paths having that semantic relation type path pattern and occurring between arbitrary pairs of words indicate that the arbitrary pairs of words have similar meanings; and
for paths between the input words including the most salient paths between the input words, combining the weights determined for the semantic relation type path patterns corresponding to the paths between the input words in order to obtain an indication of the level of similarity of the pair of input words.

12. The method of claim 11 wherein the pair of input words comprises two different words.

13. The method of claim 11 wherein the pair of input words comprises two different senses of the same word.

14. The method of claim 11 wherein the combining comprises determining the mean of the weights determined for the semantic relation type path patterns corresponding to the paths between the input words.

15. A computer system for determining the level of similarity of a pair of input words, the method comprising:
a semantic relation type path pattern weighting subsystem that, for each of a plurality of semantic relation type path patterns comprising an ordered series of semantic relation types, determines a weight for the semantic relation type path pattern characterizing the extent to which semantic relation paths having the semantic relation type path pattern and occurring between arbitrary pairs of words indicate that the arbitrary pairs of words have similar meanings; and
a weight combination subsystem that, for paths between the input words including the most salient paths between the input words, combines the weights determined for the semantic relation type path patterns corresponding to the paths between the input words in order to obtain an indication of the level of similarity of the pair of input words.

16. The computer system of claim 15 wherein the weight combination subsystem is an averager that determines the mean of the weights determined for the semantic relation type path patterns corresponding to the paths between the input words.

17. A method in a computer system for determining the level of similarity of a pair of input words, the method comprising:

identifying a plurality of semantic relation type path patterns, each comprising an ordered series of semantic relation types, whose occurrence between arbitrary pairs of words indicate that the arbitrary pairs of words have similar meanings; and if path patterns occurring between the input words include semantic relation type path patterns among the identified plurality, indicating that the input words are similar in meaning.

18. The method of claim 17 wherein the pair of input words comprises two different words.

19. The method of claim 17 wherein the pair of input words comprises two different senses of the same word.

20. A computer-readable medium whose contents cause a computer system to determine the level of similarity of a pair of input words by:

identifying a plurality the semantic relation type path patterns, each comprising an ordered series of semantic relation types, whose occurrence between arbitrary pairs of words indicate that the arbitrary pairs of words have similar meanings; and if path patterns occurring between the input words include semantic relation type path patterns among the identified plurality, indicating that the input words are similar in meaning.

21. A method in a computer system for determining the strength of a selected relationship between a pair of input words, the method comprising:

(a) selecting a multiplicity of pairs of words between which the selected relationship is known to be strong;

(b) for a each selected pair of words:
  (1) identifying the most salient semantic relation paths connecting the words of the selected pair, each identified semantic relation path comprising an ordered series of semantic relations, each semantic relation having a relation type; and
  (2) for each identified path:
    (A) extracting from the path a path pattern comprising the relation types of the relations of the path; and
    (B) augmenting a path pattern frequency indicating the likelihood that the selected relationship is strong between an arbitrary pair of words that are connected by a path having the extracted path pattern;

(c) identifying the most salient semantic relation paths connecting the input words; and (d) averaging the path pattern frequencies for the path patterns of the identified paths to obtain a quantitative measure of the strength of the selected relationship between the input words.

22. The method of claim 21, further including selecting similarity as the selected relationship.

23. The method of claim 21, further comprising:

(e) selecting a multiplicity of word pairs of a second type between which the selected relationship is known to not be strong; and (f) for each selected word pair of the second type:
  (1) identifying the most salient semantic relation paths connecting the words of the selected pair, each identified semantic relation path comprising an ordered series of semantic relations, each semantic relation having a relation type; and
  (2) for each identified path:
    (A) extracting from the path a path pattern comprising the relation types of the relations of the path; and
    (B) reducing a path pattern frequency indicating the likelihood that the selected relationship is strong between an arbitrary pair of words that are connected by a path having the extracted path pattern.

24. A computer-readable medium whose contents cause a computer system to determine the strength of a selected relationship between a pair of input words by:

(a) selecting a multiplicity of pairs of words between which the selected relationship is known to be strong;

(b) for a each selected pair of words:
  (1) identifying the most salient semantic relation paths connecting the words of the selected pair, each identified semantic relation path comprising an ordered series of semantic relations, each semantic relation having a relation type; and
  (2) for each identified path:
    (A) extracting from the path a path pattern comprising the relation types of the relations of the path; and
    (B) augmenting a path pattern frequency indicating the likelihood that the selected relationship is strong between an arbitrary pair of words that are connected by a path having the extracted path pattern;

(c) identifying the most salient semantic relation paths connecting the input words; and (d) obtaining from the path pattern frequencies for the path patterns of the identified paths a quantitative measure of the strength of the selected relationship between the input words.

25. A computer memory containing a word similarity data structure for determining the similarity of a pair of input words, the word similarity data structure comprising entries, each entry identifying:

a semantic relation type path pattern comprising an ordered series of semantic relation types; and a weight for the semantic relation type path pattern characterizing the extent to which a semantic relation paths of the semantic relation type path pattern occurring between an arbitrary pair of words indicates that the words of the arbitrary pair have similar meanings, the word similarity data structure being usable to determine the similarity of the input words by combining the weights for semantic relation type path patterns that occur between the input words.

26. The computer memory of claim 25 wherein the weight indicated by each entry of the word similarity data structure comprises the frequency with which the semantic relation type path pattern of the entry occurs between words known to be synonyms.

27. The computer memory of claim 25 wherein the weight indicated by each entry of the word similarity data structure comprises the frequency with which the semantic relation type path pattern of the entry occurs between words known to be synonyms, reduced by the frequency with which the semantic relation type path pattern of the entry occurs between words known not to be synonyms.

* * * * *

UNITED STATES PATENT AND TRADEMARK OFFICE
CERTIFICATE OF CORRECTION

PATENT NO.   : 6,098,033
DATED        : August 1, 2000
INVENTOR(S)  : Stephen D. Richardson et al.

It is certified that error appears in the above-identified patent and that said Letters Patent is hereby corrected as shown below:

```
References: Other Publications,
Line 4, "nad" should be --and--.
Line 4, "Etimation" should be --Estimation--.
Line 7, "19993" should be --1993--.

Col. 5, line 33, insert --application-- after
"patent".
Col. 7, line 33, insert --application-- after
"patent".
Col. 7, line 41, delete "15".
Col. 9, line 15, delete "in".
```

Signed and Sealed this

Twenty-fourth Day of April, 2001

Attest:

NICHOLAS P. GODICI

Attesting Officer

Acting Director of the United States Patent and Trademark Office